(12) United States Patent
Gardner et al.

(10) Patent No.: US 6,272,721 B1
(45) Date of Patent: Aug. 14, 2001

(54) BEZEL SNAP FOR COMPUTER CHASSIS

(75) Inventors: Susannah Gardner, Belmont; Lee Wical, Campbell, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/298,587

(22) Filed: Apr. 23, 1999

(51) Int. Cl.[7] .................................................. H01R 13/73
(52) U.S. Cl. ............................... 24/295; 24/618; 24/682.1
(58) Field of Search .......................... 24/295, 293, 573.1, 24/573.5, 618, 578, 620, 682.1; 292/17; 361/725, 726; 439/567

(56) References Cited

U.S. PATENT DOCUMENTS

| | | |
|---|---|---|
| 737,874 * | 9/1903 | Shipman . |
| 2,398,573 * | 4/1946 | Becker . |
| 5,123,680 * | 6/1992 | Liu . |
| 5,322,452 * | 6/1994 | Mosquera . |
| 5,593,307 * | 1/1997 | Bale et al. . |
| 5,973,926 * | 10/1999 | Sacherman et al. . |
| 5,978,232 * | 11/1999 | Jo . |

* cited by examiner

Primary Examiner—James R. Brittain (57) ABSTRACT

The present invention provides a bezel attachment configuration for securing a detachable bezel to a metal chassis. The bezel attachment mechanism preferably includes the combination of a modified bezel post extending from and integral to the plastic body of the bezel and a bezel snap that is attached to the post. The post includes at least a first region and a second region, where the cross-sectional area of the second region is less than the cross-sectional area of the first region. The difference in cross-sectional areas creates a lip between the first region and the second region that the bezel snap catches on if moved in an upward direction towards the top of the bezel post. The lip of the post acts as a barrier to further movement of the bezel snap, thus providing a secure attachment of the bezel snap to the bezel. The secure bezel snap is inserted into an opening in the metal chassis.

19 Claims, 8 Drawing Sheets

BEZEL SNAP FOR COMPUTER CHASSIS

BACKGROUND OF THE INVENTION

This invention relates generally to a housing for enclosure of a metal chassis and more specifically towards a means for securing a plastic bezel housing onto a metal chassis.

Conventionally an electronic appliance, such as a server or personal computer, is mounted in a metal chassis that is encased in an outer housing or bezel. The outer housing or bezel is used as a cosmetic and functional cover for the protection of PC boards mounted inside the metal chassis. The outer housing or bezel is typically made of plastic and is typically attached to the metal chassis housing using an attachment means that extends into the fire enclosure of the metal chassis.

Traditionally, plastic snaps are used to secure the plastic bezel to the metal chassis. The plastic snaps which extend from the main body of the bezel are formed integral to the plastic bezel using an injection molding process. The plastic snaps include an elongate generally cylindrical structure that is terminated by a foot structure. The foot structure has a width that is larger than the width of the elongate structure from which it extends and is slightly larger than its corresponding opening the sheet metal chassis.

The plastic material of the bezel is chosen so that the plastic snaps have sufficient flexure to flex inward. To secure the bezel to the metal chassis, the technician presses inward on the elongate structure of the plastic snap so that the foot of the plastic snap fits inside its corresponding opening in the metal chassis. When the foot is positioned inside of the metal chassis opening, the inward pressure is removed and the foot of the snap is secured so that the plastic snap cannot be easily removed without the application of an inward pressure. Because the foot of the plastic snap extends into the fire enclosure of the metal chassis, the plastic material used for the bezel is required to have a high UL rating. Because the plastic snap is integral to the bezel, the entire plastic bezel must be made of the high UL rated material, increasing the bezel cost.

Figure 1A:
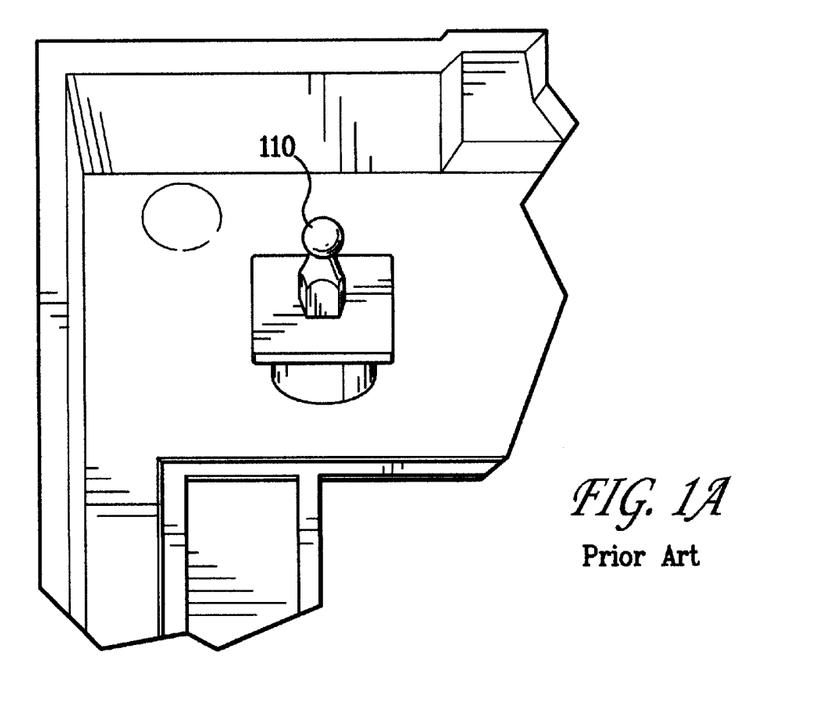
FIG. 1A shows a prior art attachment mechanism for attachment of a bezel to a metal chassis, where the attachment mechanism includes a metal ball stud component that is inserted into a metal snap receptor component for bezel attachment.
Figure 1B:
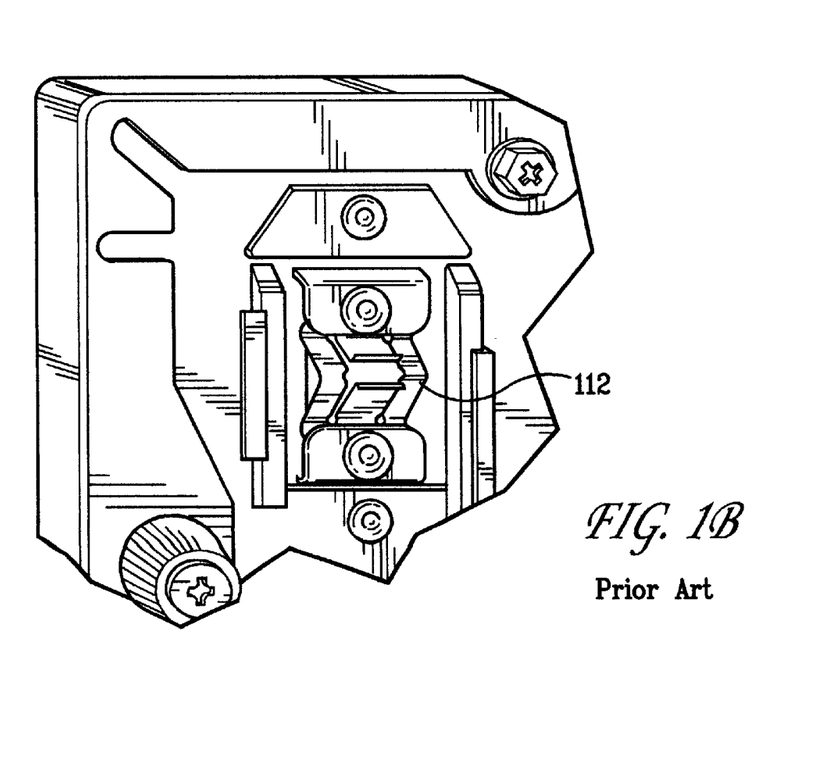
FIG. 1B shows the prior art metal snap receptor component for bezel attachment.

In a second bezel attachment configuration, the plastic snap previously described is replaced with an alternative bezel attachment mechanism. FIGS. 1A and 1B, show a prior art attachment mechanism comprised of a metal ball stud component 110 and a metal snap receptor component 112, where the opening in the metal snap receptor component is aligned with an opening in the metal chassis. The metal ball stud is a machined part that is comprised of a machined ball structure at a first end of the metal ball stud, a generally cylindrical elongate structure, and a threaded region. The threaded region is screwed into the plastic bezel so that it firmly attached to the plastic bezel.

The metal snap receptor component is a spring loaded clasping mechanism for receiving the ball structure of the metal ball stud. The opening of the metal snap receptor component is aligned to a corresponding opening formed in the metal chassis. The bezel is attached to the metal chassis by inserting the ball portion of the metal ball stud into the spring loaded clasping mechanism of the metal snap receptor component. Because only the metal stud component of the attachment mechanism extends into the fire enclosure of the metal chassis, the plastic bezel need not be comprised of a more expensive plastic material that has a high UL rating. The ability to use a cheaper plastic helps reduce the material costs of the bezel.

Although a cheaper plastic material may be used for the configuration shown in FIGS. 1A, and 1B, the metal ball stud configuration does require additional assembly compared to the plastic snap configuration since additional labor is required both to (1) screw in the snap receptor component onto the metal chassis and (2) to screw in the metal stud component into the plastic bezel. Further, the use of a screw as part of the bezel attachment mechanism, introduces the potential of the loss of a screw inside the metal chassis, increasing the possibility of a PC board short.

Figure 2:
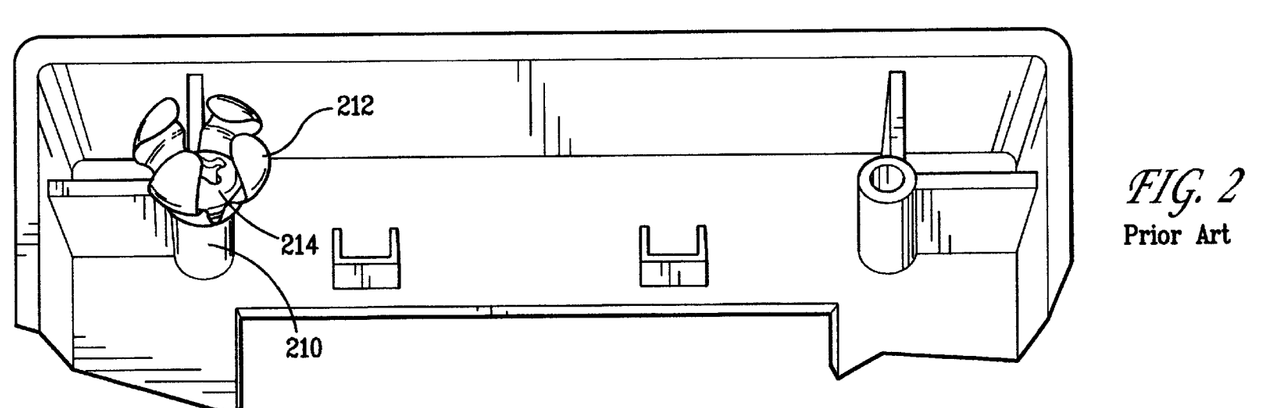
FIG. 2 shows an attachment mechanism for attachment of a bezel to a metal chassis where the attachment mechanism includes a bezel snap screwed onto the top of a bezel post.

In an alternative bezel attachment configuration shown in FIG. 2, the bezel attachment mechanism is comprised of a plastic post 210 or boss formed integral to the plastic bezel and a metal snap 212. Preferably, the plastic post or boss includes a threaded interior portion that is formed using a conventional injection molding process. The metal snap component includes a plurality of bent metal fingers that circumscribe and extend from a circular opening for receiving a screw. The metal snap component is attached to the top surface of the plastic post using a screw. The bezel is attached to the metal chassis by inserting the metal snap component into a corresponding opening formed in the metal chassis.

Because only the metal snap component of the attachment mechanism extends into the fire enclosure of the metal chassis, there is no requirement that the plastic bezel be comprised of a comprised of a more expensive plastic material that has a high UL rating, thereby decreasing bezel material costs. However, the metal snap configuration shown in FIG. 2 does require additional required the use of a screw 214 to secure the metal snap component to the plastic bezel. The use of a screw as part of the bezel attachment mechanism, introduces the potential of the loss of a screw inside the metal chassis, increasing the possibility of a PC board short.

Figure 3:
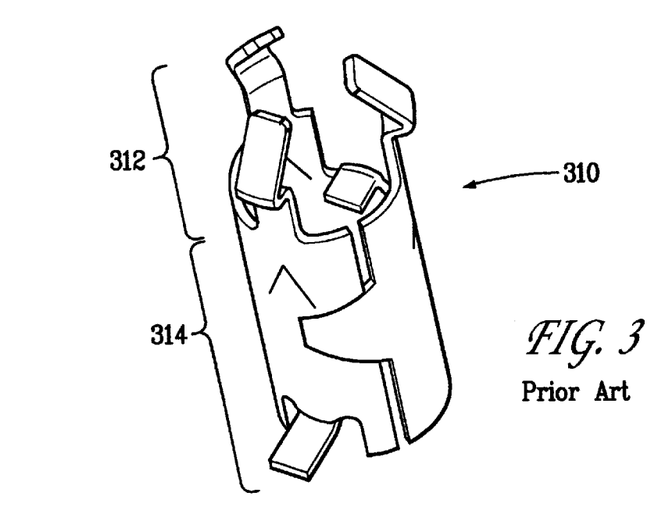
FIG. 3 shows a bezel snap used for attachment of a bezel to a metal chassis where the bezel snap fits over the bezel post.

In a fourth bezel attachment configuration, the requirement of a screw to attach the metal component is eliminated. The bezel attachment mechanism is comprised of a plastic post or boss (not shown) formed integral and a metal snap component 310 that slides over the plastic post or boss. The metal snap component 310 includes an elongate generally cylindrical region 312 that slips over the post of the bezel and an attachment region 314 that includes a plurality of bent fingers that extends from the elongate region. The elongate region includes a plurality of inwardly punched triangular regions that are used to dig into the plastic boss, thus providing a more secure attachment. To attach the plastic bezel to the metal chassis, the attachment region of the metal snap component is inserted into a corresponding opening of the metal chassis.

Because the only portion of the bezel snap that fits into the metal chassis is the attachment region, a less expensive plastic that is not UL rated may be used for the plastic bezel. Further, assembly costs are low since the metal snap component does not have to be secured by screwing the component onto the post, but is merely slid over the plastic post of the bezel. Unfortunately, although assembly is easy because the metal snap component does not need to be screwed onto the plastic post, the attachment of the metal snap component may not be as secure as the configurations shown in FIGS. 1 and 2. After multiple removals, the metal snap component may slide off the bezel post and may need to be reattached. In addition, because the metal snap component may slide off into the metal chassis when being removed, the possibility of a PC board short is introduced.

An inexpensive method and apparatus for firmly securing a bezel to a metal chassis that is inexpensive and easy to assemble is needed.

SUMMARY OF THE INVENTION

The present invention provides a configuration for securing a bezel to a metal chassis that is inexpensive and simple to assemble and implement. The bezel attachment configuration requires a detachable bezel that preferably includes at least a post extending from and integral to the plastic main body portion and a bezel snap that is attached to the post. The post includes at least a first region and a second region, where the cross-sectional area of the second region is less than the cross-sectional area of the first region. The difference in cross sectional areas creates a lip between the first region and the second region.

The bezel snap is designed to slide over the post of the plastic main body and is typically comprised of an elongate first region and an attachment region. The elongate first region includes at least a first moveable extension or tab, typically a punch section, that extends from the elongate first region. The moveable tab is designed so that as the elongate first section is moved downward toward the base of the post, the moveable tab is pressed inward, allowing the first elongate section of the bezel snap to move easily down the post of bezel. When the moveable tab is pulled upward towards the top of the post, the tab contacts the lip of the post. Thus, the lip of the post acts as a barrier to further movement of the bezel snap, thus providing a secure attachment of the bezel snap to the bezel.

The bezel snap also includes an attachment region that is inserted into a corresponding opening on the metal chassis. The attachment region includes a plurality of fingers that extend from the base of the attachment region. In preferred embodiment, the plurality of fingers includes alternating bent and straight fingers. Alternating bent and straight fingers provides secure attachment and additionally adds protection to the attachment region of the bezel snap because straight leads are stronger than bent leads and less susceptible to damage. Further, the straight leads act as an alignment feature which allows the snap to be self centering.

The bezel attachment configuration of the present invention provides an inexpensive way to secure the bezel to the chassis. Because the attachment region of the bezel snap is the only portion of the bezel attachment mechanism that extends into the fire enclosure of the metal chassis, the plastic bezel need not be comprised of a more expensive plastic material that has a high UL rating. Further, costs are reduced since assembly due to labor cost is minimal. Attaching the bezel snap involves merely sliding the bezel snap over the bezel post and locking it into place by ensuring that the moveable tab abuts the lip of the post.

Further, no screws are needed to attach the bezel snap. Elimination of the use of screws in the bezel attachment configuration helps reduce labor costs but in addition decreases the possibility of a PC board short. In alternative configurations, either an insecure attachment of the bezel attachment component (either a screw or the actual component itself), introduces the possibility of a metal snap component being lost inside the metal chassis, potentially resulting in a short.

A further understanding of the nature and advantages of the present invention may be realized with reference to the remaining portions of the specification and the attached drawings.

DETAILED DESCRIPTION OF THE PREFERRED EMBODIMENTS

Figure 4A:
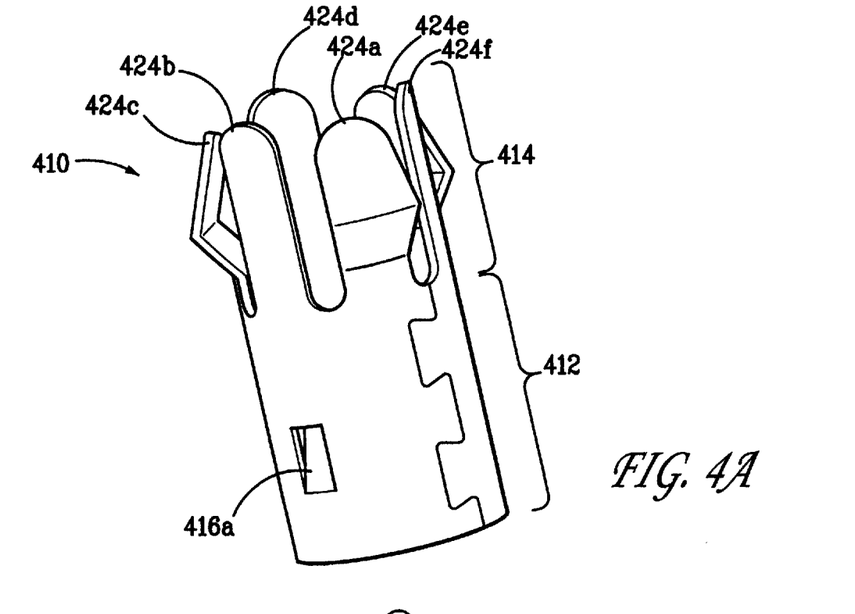
FIG. 4A shows an isometric view of the preferred embodiment of the bezel snap according to the present invention.

The present invention provides a method and apparatus for securing a detachable bezel to a metal chassis. The bezel attachment mechanism includes a post extending from and integral to the main body portion of the bezel and a bezel snap. Referring to FIG. 4A shows an isometric view of the bezel snap according to the preferred embodiment of the present invention. The bezel snap 410 is comprised of metal, typically 301 Stainless Steel, ¼ hard, and includes an elongate first region 412 and an attachment region 414.

Figure 5A:
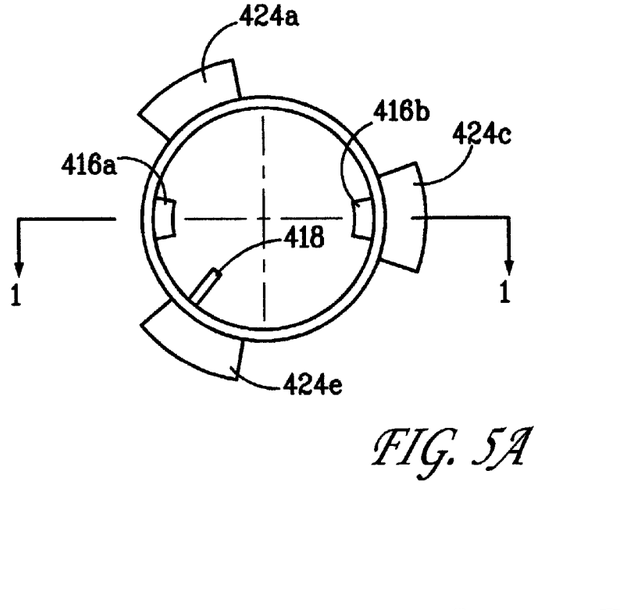
FIG. 5A shows a top view of the bezel snap according to the present invention.

The bezel snap 410 shown in FIG. 4A is designed to slide over at least a portion of the post that extends from the main body of the bezel. Referring to FIG. 5A shows a top view of the bezel snap according to the present invention. The elongate first region 412 includes at least a first moveable extension or tab 416*a* that extends from the elongate first region. In the preferred embodiment, the elongate first region 412 of the bezel snap includes at least a first tab 416*a* and an alignment post 418.

Figure 5B:
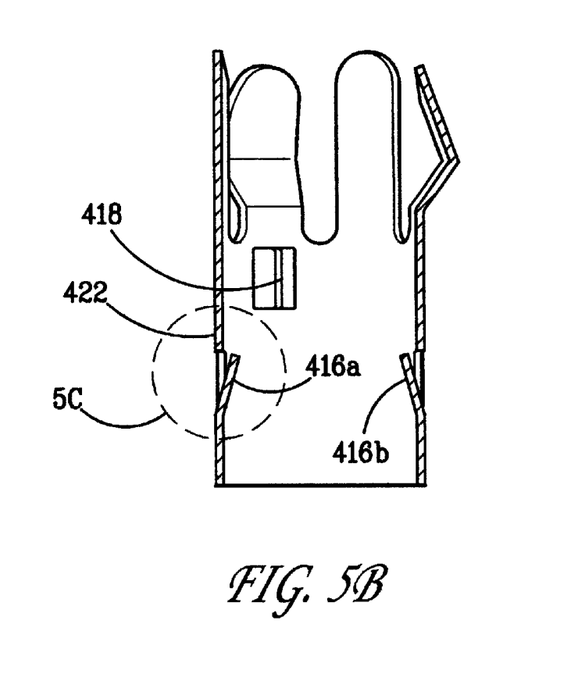
FIG. 5B shows a cross-sectional view of the bezel snap shown in FIG. 5A along the 1—1 axis.
Figure 5C:
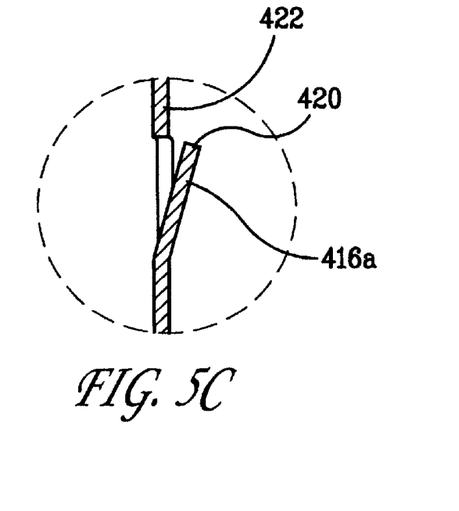
FIG. 5C shows a magnified view of the tab shown in the circular detail of FIG. 5B.

In the preferred embodiment, the elongate first region includes a first 416*a* and second tab 416*b*. Typically, the first and second tabs are punch cut from the sheet metal during manufacture in a rectangular shape so that the metal tabs extend inward toward the center of the bezel snap. Referring to FIGS. 5A–5C, it can be seen that the first and second tab extend inward towards the center of the bezel snap.

FIG. 5B shows a cross-sectional view of the bezel snap 410 shown in FIG. 5A along the 1—1 axis. FIG. 5C shows a magnified view of the tab 416*a* shown in the circular detail of FIG. 5B. In the preferred embodiment the length of the tab is approximately 3 mils. The angle between the sidewall of the bezel snap and the tab is preferably between 10 and 20 degrees. However, the critical angle or position of the tab is a position where the end or tip 420 of the tab is positioned so that it extends past the sidewall of the lip of the bezel post when the lip of the bezel post is positioned above the tip of the tab of the bezel snap. This position allows the lip of the bezel post to catch on the tip of the tab of the bezel snap, preventing further movement, thus firmly securing the bezel snap onto the bezel post.

The tab 416a, 416b is designed to be moveable so that when the elongate first section is moved downward toward the base of the bezel post, the tab section 416a, 416b is pressed away from the center of the bezel towards the sidewall 422 of the bezel snap, thus allowing the first elongate section of the bezel snap to move easily down the post of bezel. When the moveable extension is pulled upward towards the top of the bezel post, the moveable tab extension again moves away from the center of the bezel allowing movement of the bezel snap until contact is made between the tip of the tab and the lip of the post. The tab is positioned to catch underneath the lip of the bezel post, thus prevent further upward movement of the bezel snap.

In the preferred embodiment of the present invention, the elongate first section includes an alignment feature. Referring to FIGS. 5A, 5B, and 5C show the alignment feature 424. The alignment feature is typically is a locating tab bent at right angles to the inner diameter of the bezel snap and is used to align the bezel snap with a corresponding slot on the bezel boss. The alignment post 418 keeps the bezel snap from rotating on the post, further securing the bezel snap. Thus, the tabs 416a, 416b help prevent vertical motion of the bezel snap along the central axis of the bezel snap while the alignment post 418 helps prevent rotation of the bezel snap around the central axis of the bezel snap.

Figure 4B:
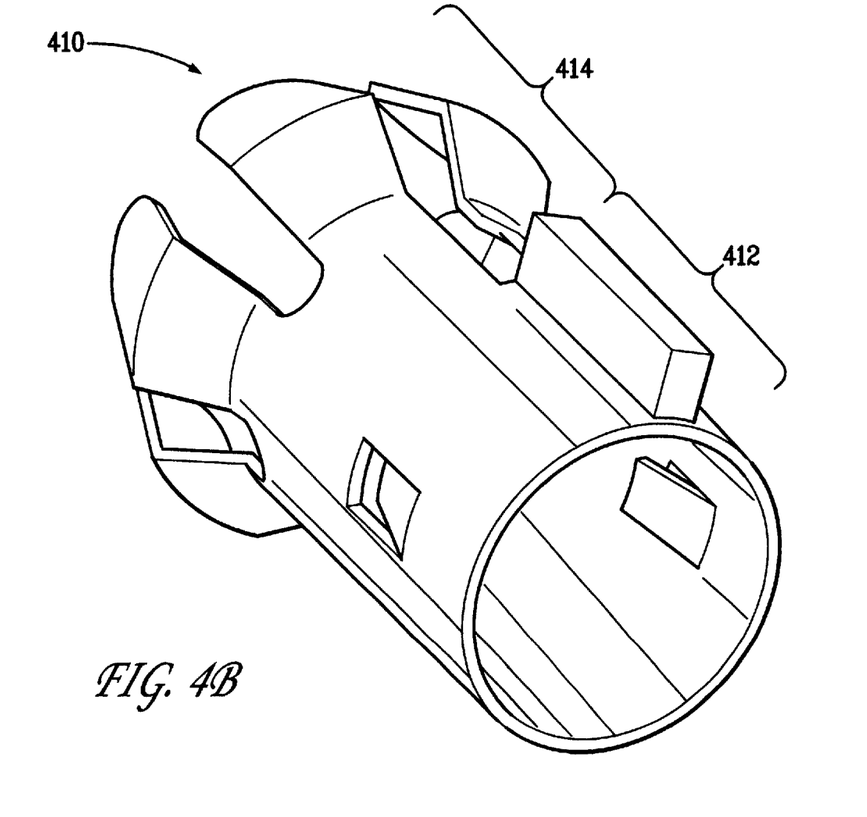
FIG. 4B shows an isometric view of an alternative embodiment of the bezel snap where all of the fingers of the bezel snap are bent.

The bezel snap 410 includes an attachment region 414 that is typically inserted into a corresponding opening on the metal chassis. The attachment region includes a plurality of fingers 424a–f or leads. In the preferred embodiment, the bezel snap includes six metal fingers, three bent 424a, 424c, 424e and three straight 424b, 424d, 424f. Preferably, the bent and straight fingers are alternating. In an alternative embodiment, shown in FIG. 4B, all of the fingers of the bezel snap are bent. However, the alternating finger configuration shown in FIG. 4A is preferred in part because of benefits associated with the straight fingers.

Referring to FIG. 4A, the straight fingers are the same length as the bent fingers, however, because of the angle in the bent leads 424a, 424c, 424e, the straight leads 424b, 424d, 424f extend past the tip of the bent leads. This adds some protection to the bezel snap because straight fingers are stronger than bent fingers and are less susceptible to damage.

The diameter of the straight fingers is smaller than the diameter of the hole in the meal chassis so the straight fingers are easier to insert than bent fingers. Thus, in the preferred embodiment when inserting the bezel snap into the metal chassis, the straight fingers of snap are the first to hit the metal chassis. The straight fingers 424b, 424d, 424f provide a little extra lead in to the opening in the metal chassis. Further, the straight leads provide alignment for the bezel component snap which allows the snap to be self centering.

In preferred embodiment, the metal chassis opening which receives the bezel snap 410 is circular. Although the number of fingers 424a–f of the attachment region 414 may vary, in general increasing the number of fingers allows for better fit of bezel snap into circular opening. Also, the addition of more fingers to the attachment region allows each finger to take on less load.

Although the preferred embodiment the attachment region 414 includes six fingers, (three bent, three straight), the attachment region may be modified dependent on the desired interference between the hole in the metal chassis and the bezel snap 410. The interference between the hole in the metal chassis and the bezel snap 410 effects the amount of force required to remove or snap in the bezel snap. In addition to varying the number of fingers in the attachment region, the material used for the bezel snap may be varied to vary the strength of the bezel snap fingers. For example, using a thinner material for the bezel snap would make removal of the bezel snap easier. Alternatively, the bend angle of the fingers of the bezel snap could be modified to vary the interference. For example decreasing the bend angle of the fingers in the attachment region would make removal of the bezel snap easier.

Figure 6:
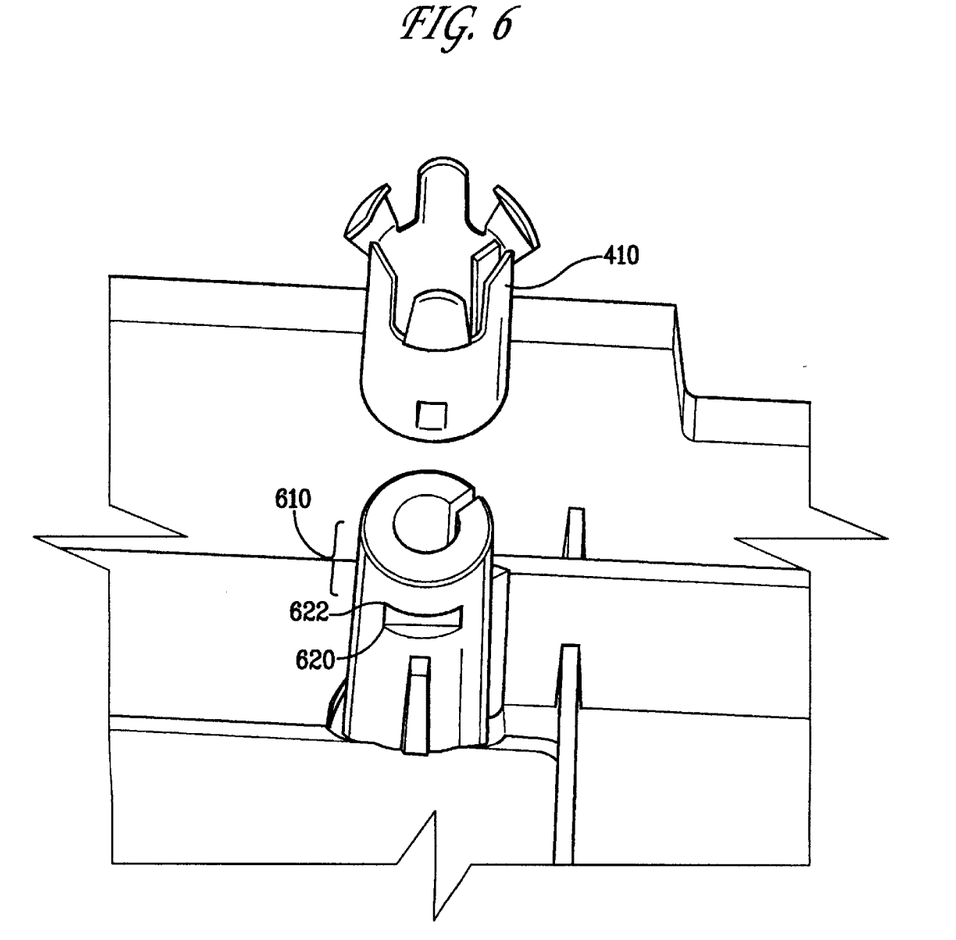
FIG. 6 shows an isometric view of a bezel snap positioned for alignment before attachment of the bezel snap to the bezel post.
Figure 7:
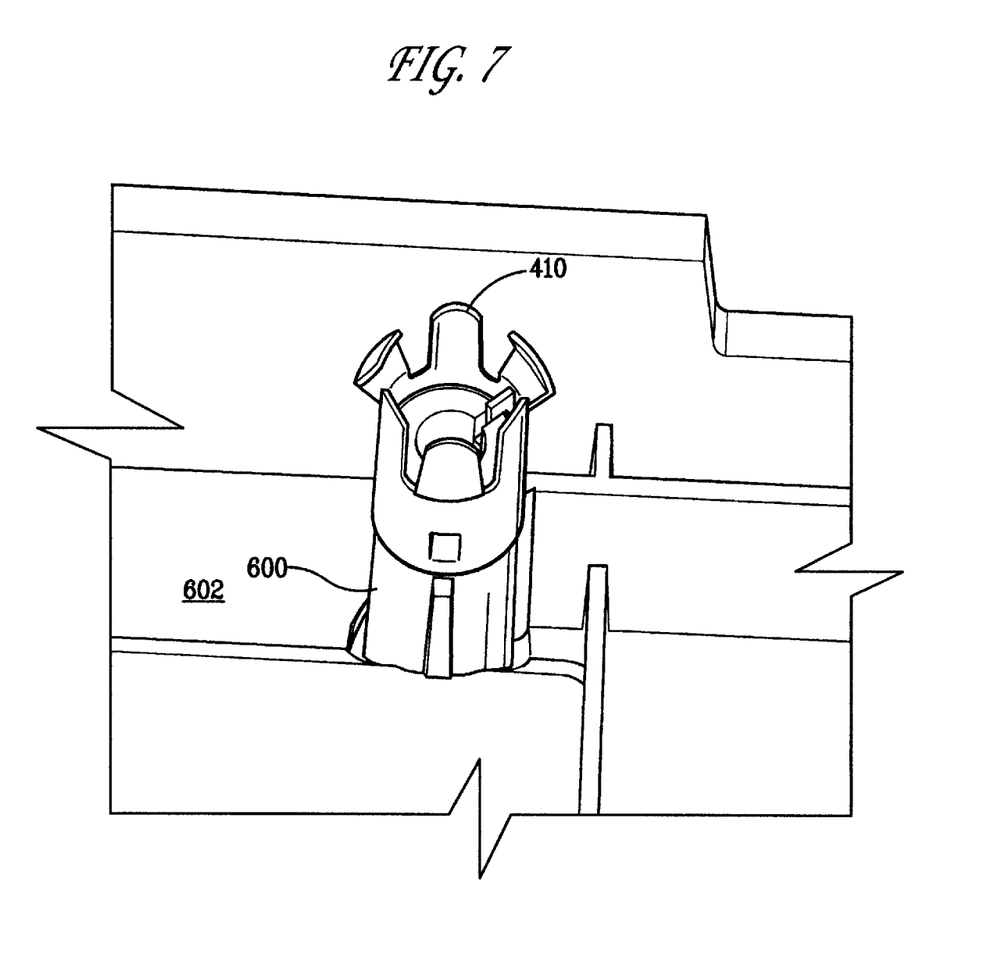
FIG. 7 shows an isometric view of the bezel snap after attachment of the bezel snap to the bezel post.

The bezel snap 410 is attached to a post 600 extending from the main body 602 of the bezel. FIG. 6 shows an isometric view of a bezel snap positioned for alignment before attachment of the bezel snap to the bezel post. FIG. 7 shows an isometric view of the bezel snap after attachment of the bezel snap to the bezel post.

Referring to FIGS. 6 and 7 shows a post 600 extending from the main body 602 of the bezel. In the preferred embodiment the bezel is from an inexpensive low UL rated plastic by an injection molding process. The post is molded to include at least a first region 610 and a second region 620, where the first region and the second region both have different cross-sectional areas. Referring to FIG. 6, in the preferred embodiment, the cross-sectional area of the second region is less than the cross-sectional area of the first region. The difference in the cross-sectional areas of the regions does not gradually increase or decrease, but instead has an abrupt differentiation in order to form a lip 622 or edge. It is this lip or edge that is caught by the tip of the tab of the bezel snap.

In the preferred embodiment, the post shown also includes a slot or opening that corresponds to the alignment feature on the bezel snap. Upon installing the bezel snap onto the post, the alignment feature is aligned to slide into the alignment slot shown on the post.

Figure 8:
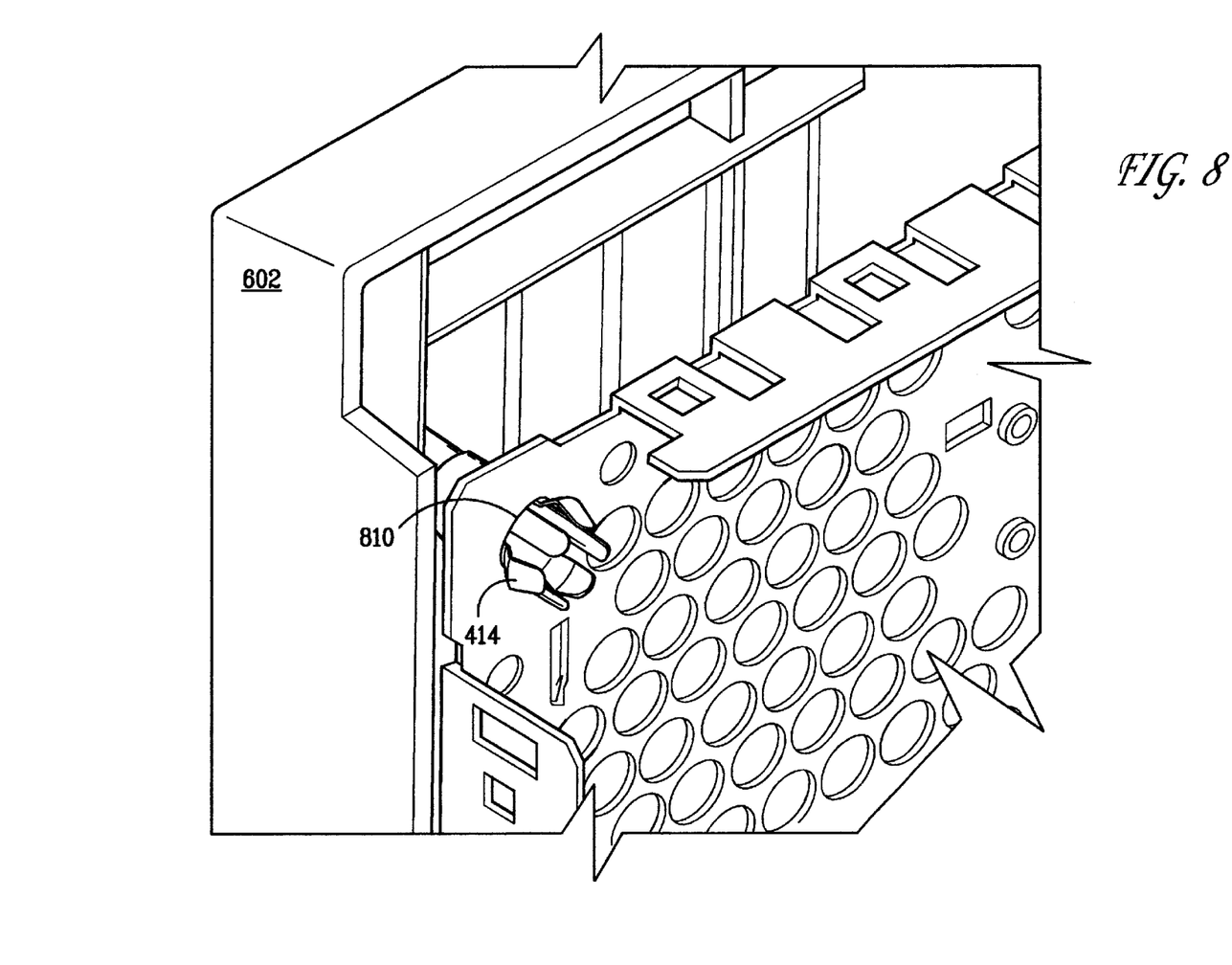
FIG. 8 shows an isometric view of the alignment region of the bezel snap after insertion into its corresponding opening in the metal chassis.

Referring to FIG. 8 shows the bezel snap after insertion of the bezel snap into an opening in the metal chassis. In the preferred embodiment, the bezel snap shown in FIG. 7 is inserted into an opening 810 of the metal chassis. Upon insertion into the metal chassis, the straight fingers of the bezel snap enter the opening 810 in the chassis first, followed by the bent fingers. On insertion, the pressure from the sidewalls of the opening press the bent fingers of the bezel snap inward so that the bent fingers are allowed to enter the opening. After being pushed through the opening, the bezel snap fingers extend or snap outward, securing the position of the bezel snap, and therefore the bezel, in the metal chassis.

Figure 9:
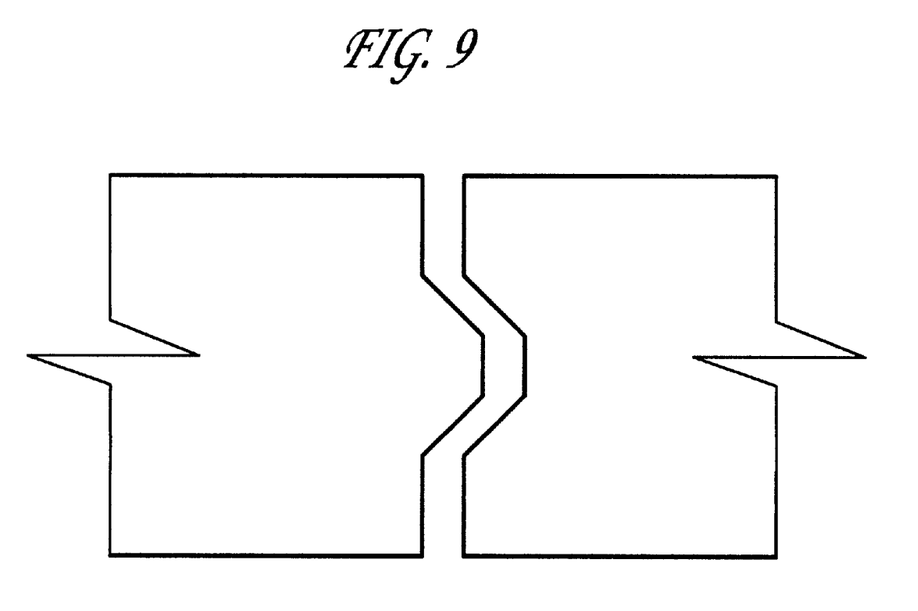
FIG. 9 shows a representation of a punch cut pattern that Applicant believes could be used for the base of the bezel snap shown in FIG. 3.

In the preferred embodiment of the present invention, the bezel snap is cut from a roll of sheet metal that has a punch cut pattern. FIG. 9 shows a representation of a punch cut pattern that Applicant believes could be used for the base of the bezel snap shown in FIG. 3. Applicant believes that although the pattern in FIG. 9 could be useful in eliminating twisting along the seam of the snap, it creates problems in that it is subject to splitting when moving over the post or boss. In the preferred embodiment of the present invention, the punch cut pattern for the elongate region of the bezel snap is formed using a dovetail pattern and process. When the dovetail punch pattern is rolled around the mandrel for stamping, the seam flattens out so that the metal flows outward filling gaps between the metal. This helps prevent the splitting along the seams of the cylinder that has been found in other snap components.

It is understood that the above description is intended to be illustrative and not restrictive. For example, an alternative attachment seam may used instead of using a dovetail joining process. The scope of the invention should therefore be determined with reference to the appended claims, along with the full scope of equivalents to which such claims are entitled.

What is claimed is:

1. An attachment mechanism for detachable installation of a bezel comprised of a first material onto a metal chassis for an electronic appliance, the bezel comprising:
    a main body of the bezel including at least a post extending from and integral to the main body, the post including at least a first region and a second region wherein the cross-sectional area of the second region is less than the cross-sectional area of the first region, wherein a differential between the two cross-sectional areas forms a lip;
    a bezel snap designed to slide over the post of the main body of the bezel, the bezel snap including a first elongate region and an attachment region, the bezel snap including a tab section in the first elongate region designed to catch the lip of the post of the main body of the bezel when the bezel snap is pulled upward towards the top of the bezel post, wherein the attachment region of the bezel snap is designed to fit into an opening of the metal chassis; and
    means for substantially preventing the bezel snap from rotating around the post.

2. The attachment mechanism described in claim 1 wherein the attachment region includes a plurality of alternating fingers, the plurality of alternating fingers alternating between bent fingers and straight fingers.

3. The attachment mechanism recited in claim 2 wherein the bezel snap includes six fingers, three bent leads and three straight leads.

4. The attachment mechanism of claim 1, further comprising an alignment post to substantially prevent the bezel snap from rotating around the post.

5. The attachment mechanism of claim 1, wherein the first material comprising the bezel and the post is comprised of a plastic.

6. The attachment mechanism of claim 1, wherein the first material comprising the bezel is a plastic and the bezel snap is comprised of a metal.

7. A method for attaching a bezel comprised of a first material onto a metal chassis for an electronic appliance, comprising:
    forming a lip on a differential between two cross-sectional areas on a post on a main body of the bezel, the post including at least a first region and a second region wherein the cross-sectional area of the second region is less than the cross-sectional area of the first region;
    sliding a bezel snap over the post of the main body of the bezel, the bezel snap including a first elongate region and an attachment region, the bezel snap including a tab section in the first elongate region designed to catch the lip of the post of the main body of the bezel when the bezel snap is pulled upward towards the top of the bezel post, wherein the attachment region of the bezel snap is designed to fit into an opening of the metal chassis; and
    aligning the bezel snap to substantially prevent rotation of the bezel snap around the post.

8. The method of claim 7, wherein the first material comprising the bezel and the post is comprised of a plastic.

9. The method of claim 7, wherein the first material comprising the bezel is a plastic and the bezel snap is comprised of a metal.

10. The method of claim 7, further comprising aligning the bezel snap with an alignment post to substantially prevent rotation of the bezel snap around the post.

11. An attachment mechanism for detachable installation of a bezel onto a metal chassis for an electronic appliance, the bezel comprising:
    a main body of the bezel including a post extending from the main body, the post including at least a first region and a second region wherein the cross-sectional area of the second region is less than the cross-sectional area of the first region, wherein a differential between the two cross-sectional areas forms a lip; and
    a bezel snap designed to slide over the post of the main body of the bezel, the bezel snap including a first elongate region and an attachment region, the bezel snap including a tab section in the first elongate region designed to catch the lip of the post of the main body of the bezel when the bezel snap is pulled upward towards the top of the bezel post, wherein the attachment region of the bezel snap comprises a plurality of fingers to snap into the metal chassis; and
    means for substantially preventing the bezel snap from rotating around the post.

12. The attachment mechanism of claim 11, further comprising an alignment post to substantially prevent the bezel snap from rotating around the post.

13. The attachment mechanism of claim 11, wherein the bezel and the post are comprised of a plastic.

14. The attachment mechanism of claim 11, wherein the bezel is comprised of a plastic and the bezel snap is comprised of a metal.

15. An attachment mechanism for detachable installation of a bezel comprised of a first material onto a metal chassis for an electronic appliance, the bezel comprising:
    a main body of the bezel including at least a post extending from and integral to the main body, the post including at least a first region and a second region wherein the cross-sectional area of the second region is less than the cross-sectional area of the first region, wherein a differential between the two cross-sectional areas forms a lip; and
    a bezel snap designed to slide over the post of the main body of the bezel, the bezel snap including a first elongate region and an attachment region, the bezel snap including a tab section in the first elongate region designed to catch the lip of the post of the main body of the bezel when the bezel snap is pulled upward towards the top of the bezel post, wherein the attachment region of the bezel snap is designed to fit into an opening of the metal chassis and the attachment region includes a plurality of alternating fingers, the plurality of alternating fingers alternating between fingers and straight fingers.

16. An attachment mechanism for detachable installation of a bezel comprised of a first material onto a metal chassis for an electronic appliance, the bezel comprising:

a main body of the bezel including at least a post extending from and integral to the main body, the post including at least a first region and a second region wherein the cross-sectional area of the second region is less than the cross-sectional area of the first region, wherein a differential between the two cross-sectional areas forms a lip; and a bezel snap designed to slide over the post of the main body of the bezel, the bezel snap including a first elongate region and an attachment region, the bezel snap including a tab section in the first elongate region designed to catch the lip of the post of the main body of the bezel when the bezel snap is pulled upward towards the top of the bezel post, wherein the attachment region of the bezel snap is designed to fit into an opening of the metal chassis and the attachment region includes a plurality of alternating fingers, the plurality of alternating fingers alternating between fingers and straight fingers, and includes six fingers, three bent leads and three straight leads.

17. An attachment mechanism for detachable installation of a bezel comprised of a first material onto a metal chassis for an electronic appliance, the bezel comprising:

a main body of the bezel including at least a post extending from and integral to the main body, the post including at least a first region and a second region wherein the cross-sectional area of the second region is less than the cross-sectional area of the first region, wherein a differential between the two cross-sectional areas forms a lip;

a bezel snap designed to slide over the post of the main body of the bezel, the bezel snap including a first elongate region and an attachment region, the bezel snap including a tab section in the first elongate region designed to catch the lip of the post of the main body of the bezel when the bezel snap is pulled upward towards the top of the bezel post, wherein the attachment region of the bezel snap is designed to fit into an opening of the metal chassis; and an alignment post to substantially prevent the bezel snap from rotating around the post.

18. A method for attaching a bezel comprised of a first material onto a metal chassis for an electronic appliance, comprising:

forming a lip on a differential between two cross-sectional areas on a post on a main body of the bezel, the post including at least a first region and a second region wherein the cross-sectional area of the second region is less than the cross-sectional area of the first region;

sliding a bezel snap over the post of the main body of the bezel, the bezel snap including a first elongate region and an attachment region, the bezel snap including a tab section in the first elongate region designed to catch the lip of the post of the main body of the bezel when the bezel snap is pulled upward towards the top of the bezel post, wherein the attachment region of the bezel snap is designed to fit into an opening of the metal chassis; and aligning the bezel snap with an alignment post to substantially prevent rotation of the bezel snap around the post.

19. An attachment mechanism for detachable installation of a bezel onto a metal chassis for an electronic appliance, the bezel comprising:

a main body of the bezel including a post extending from the main body, the post including at least a first region and a second region wherein the cross-sectional area of the second region is less than the cross-sectional area of the first region, wherein a differential between the two cross-sectional areas forms a lip; and a bezel snap designed to slide over the post of the main body of the bezel, the bezel snap including a first elongate region and an attachment region, the bezel snap including a tab section in the first elongate region designed to catch the lip of the post of the main body of the bezel when the bezel snap is pulled upward towards the top of the bezel post, wherein the attachment region of the bezel snap comprises a plurality of fingers to snap into the metal chassis; and an alignment post to substantially prevent the bezel snap from rotating around the post.

* * * * *